Dec. 13, 1949    J. D. DONALDSON    2,490,860
VEHICLE SCALE
Filed Sept. 24, 1945

Inventor:
JACK D. DONALDSON,
by N. J. Elliott
Attorney

Patented Dec. 13, 1949

2,490,860

UNITED STATES PATENT OFFICE 2,490,860

VEHICLE SCALE

Jack D. Donaldson, Mineral, Wash.

Application September 24, 1945, Serial No. 618,203

3 Claims. (Cl. 265—40)

This invention relates to means for indicating the approximate load on a truck or trailer and has special reference to such devices adapted for use in the logging and lumber industries, and other similar usage, such as railroad cars.

The objects of my invention are, first, to provide a device which will indicate the approximate load being borne on a truck or trailer, without itself bearing any substantial part of the load; second, which will indicate such load even if the vehicle is being loaded on a side hill; third, in which the readings may be adjusted; fourth, in which the indicating means may be of standard construction and yet adaptable to trucks of various capacities; fifth, in which the apparatus is thoroughly protected against the dust and dirt of practical operation in the woods or other places or rough usage; sixth, in which the apparatus is protected from shock incident to travel on rough roads; seventh, which is adapted to be sealed by the authorities against adjustment or tampering; eighth, in which the load does not need to be well balanced on the vehicle; and ninth, which is simple to install, automatic in action, and effective in use.

I attain these and other objects as will be readily understood by those skilled in the art, by the devices and arrangements illustrated in the accompanying drawings, in which—

Figure 1:
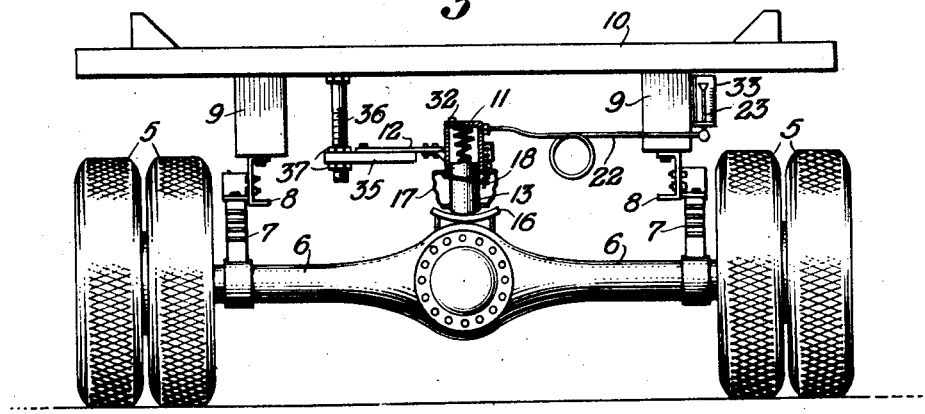
Figure 2:
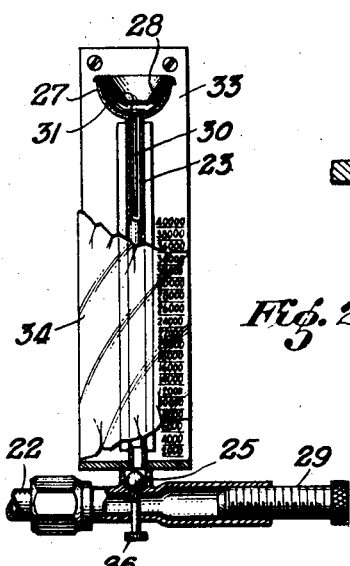
Figure 4:
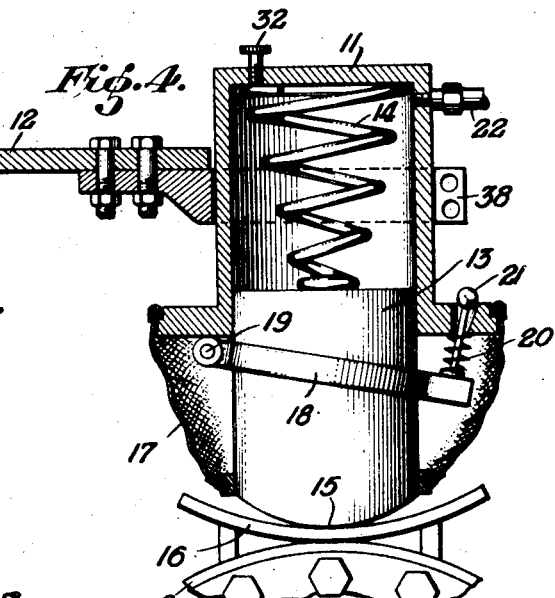
Figure 3:
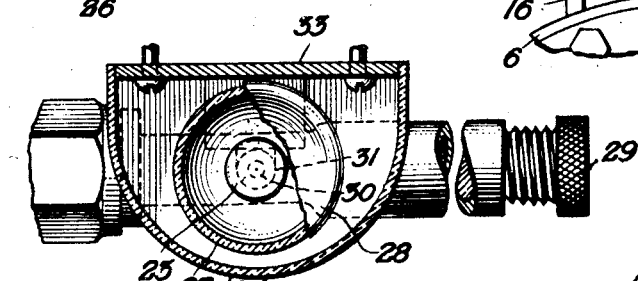

Fig. 1 is a rear elevation, partly in section, showing my apparatus in use; Figs. 2 and 3 are an elevation and a plan (on a larger scale) partly in section, of the load indicating apparatus; and Fig. 4 is a section of the operating apparatus.

Similar numerals of reference refer to similar parts throughout the several views.

In many states the limitations to the loading of trucks is strictly enforced and if the driver of a truck is found with a load exceeding the limit allowed for his vehicle he is liable to severe penalties. However if his load consists of only a few heavy items, and these items vary greatly in their weight, as is the case with logs, it is difficult for the driver to know just how great a load he is taking on, and if once overloaded he cannot take the time to unload a log because the log handlers cannot block the steady flow of logs and he must proceed to give place for the next truck. In order to overcome this difficulty I have invented the following described means of registering the approximate load on the truck, during loading, so that he may watch that the load is as great as possible but does not exceed the amount he is allowed by law to carry.

Referring, now, to the drawings, the truck or trailer is supported by the wheels 5 and the axle 6, comprising the supporting structure, by means of suitable springs 7.

The springs 7 connect the said supporting structure to the frame of the truck. This frame comprises, in part, the beams 8, the bed timbers 9, and the load bed 10. It is evident that the measure of the bed load can be approximately ascertained by the depression of the load bed 10 in relation to the axle 6, or by the compression of the springs 7.

There are numerous ways in which this depression can be measured, the one most generally used comprises hanging a chain from the bed 10 and noting when the chain reaches a given point on the axle, but this method is very unreliable in the woods since the depression of the truck frame under the static load is very small and cannot easily be measured while my invention gives expanded readings for these small movements; also such a method does not indicate whether an additional log may be placed on the truck without risking penalties.

As seen in the drawings, I suspend a vertical cylinder 11, by means of a flat shock-absorbing spring 12, from the load bed 10, or other suitable part of the frame, said cylinder being provided with a suitable plunger 13. This plunger 13 is pressed outward from the cylinder 11 by a suitable spring 14. The outer end 15 of the plunger 13 is rounded and is adapted to bear on the concave plate 16 mounted on the axle 6.

A suitable protecting cover 17 of leather or other suitable flexible material is fastened to the casting of the cylinder 11 and to the end 15 of the plunger, to protect it from the dust and dirt incident to the use of the truck. An automatic clutch 18 (Fig. 4) is provided, which tends to hold the plunger 13 up in the cylinder 11, said clutch 18 being hung on a pivot 19 and being actuated by a spring 20 and being released by means of a pull-rod 21.

The cylinder is filled with a suitable fluid, such as air, or preferably oil, and is provided at its upper end with an outlet pipe 22 which is flexible and leads to a means for registering the movement of the plunger and positioned at any suitable place on the frame.

In a normal truck the vertical movement of the frame under the static action of the load is very small but by making the diameter of the cylinder 11 large in comparison to the size of the pipe 22, such small motion of the plunger produces an increased movement, or pressure, of the fluid in the pipe, which can be readily indicated.

The simplest means of indicating such motion of a liquid is by using a glass tube 23, mounted vertically beside a scale (Figs. 2 and 3) and having a float or a colored liquid therein, said tube 23 being attached to the end of the pipe 22. A ball valve 25 is placed in the connection between the said parts, to hold the liquid at the highest point reached in the tube 23. A relief pin 26 is adapted to raise the ball valve, when desired. An overflow cup 27 is connected to the upper end of the tube 23 to receive any overflow therefrom, should any occur. A removable cover 28, of rubber or other suitable material, covers the cup 27. An adjusting screw 29 is mounted in the connection between the pipe 22 and the tube 23 to adjust the level of the liquid in the tube if necessary.

In order to get the maximum movement of the liquid in the tube 23 and yet in order to manufacture and sell only one size of the above described apparatus, it is evident that the size of the tube 23 must be so as to give the required motion of the liquid under the heaviest load, and therefore for the largest truck, and that when the apparatus is mounted on a smaller sized truck the size of the tube 23 must be reduced to give the maximum movement under the lighter load. I accomplish this by inserting a suitably sized pin 30, having a head 31, which hangs by its head freely in the tube 23 and which therefore reduces the net cross-sectional area and thus increases the readings accordingly for smaller increments in the load. Pins 30, of different diameters may be sold with the apparatus for its use on trucks of different load capacities.

It will be observed that I have provided a screw cap 32 in the upper end of the cylinder to close an opening adapted for filling the cylinder with the liquid and for bleeding out any air caught in the tube 23 and pipe 22.

The entire indicating apparatus may be mounted on a supporting board 33 and protected by a transparent cover 34. In such cases as when the authorities require that this apparatus be inspected and sealed, all the adjustable parts may be sealed by suitable well-known means. In that case the adjustment may be made periodically as well as when the supporting springs may have weakened, or have been replaced.

It will be observed that the shock absorbing spring 12 which supports the cylinder 11, is flat and is mounted on a bar 35 which is adjustably mounted on the screw-threaded hanger rod 36 by suitable nuts 37 thereon. Also the position of the cylinder on the spring 12 may be adjusted by loosening the clamping ring 38 which attaches it to the said spring 12.

It will also be observed that the action of the curved end 15 of the plunger 13 on the concaved plate 16 on the axle 6 enables the apparatus to function with considerable accuracy even when the load bed 10 is not parallel with the axle 6, as when the load is not well balanced on the bed or when the axle is not level as when the loading is done when the truck is on the side of a hill.

It is plain that many changes may be made in the details of construction of my invention without departing from the spirit thereof as outlined in the appended claims.

I claim:

1. In a vehicle scale, the combination with a supporting structure; a frame supported from said structure by spring means; a cylinder; a horizontal bracket supported by said frame; a flat spring secured to and supported in horizontal position by and above said bracket, and flexible upward therefrom, and secured to and supporting said cylinder against downward motion, whereby said cylinder is permitted to give way upward under shock; a plunger in said cylinder and engaging said structure; a fluid filling said cylinder; and means for registering the fluid displaced by said plunger in said cylinder.

2. In a load indicating device, the combination with a supporting structure; a frame supported from said structure by spring means; a cylinder mounted on said frame; a plunger in said cylinder and engaging said structure; releasable clutch means permitting the upward motion of said plunger in said cylinder but preventing the downward movement thereof therein; a fluid filling said cylinder; and means for registering the fluid displaced by said plunger in said cylinder.

3. In a load indicating device, the combination with a supporting structure; a frame supported from said structure by spring means; an adjustable bracket supported by said frame; a cylinder; a spring secured to and supported in horizontal position above said bracket and flexible upward therefrom and supporting said cylinder from said bracket, whereby said cylinder is permitted to give way upward under shock; a plunger in said cylinder and engaging said structure; a fluid filling said cylinder; and means for registering the fluid displaced by said plunger in said cylinder.

JACK D. DONALDSON.

REFERENCES CITED

The following references are of record in the file of this patent:

UNITED STATES PATENTS

| Number | Name | Date |
|---|---|---|
| 1,136,634 | Watres | Apr. 20, 1915 |
| 1,147,128 | Troll | July 20, 1915 |
| 1,227,503 | Troll | May 22, 1917 |
| 1,294,298 | Moulton | Feb. 11, 1919 |
| 1,359,834 | Parker | Nov. 23, 1920 |
| 1,407,078 | Murray | Feb. 21, 1922 |
| 1,584,489 | Swartley | May 11, 1926 |

FOREIGN PATENTS

| Number | Country | Date |
|---|---|---|
| 310,802 | Germany | Dec. 13, 1917 |